US009477080B2

United States Patent
Ando et al.

(10) Patent No.: US 9,477,080 B2
(45) Date of Patent: Oct. 25, 2016

(54) HEAD-UP DISPLAY DEVICE

(71) Applicant: DENSO CORPORATION, Kariya, Aichi-pref. (JP)

(72) Inventors: Hiroshi Ando, Nagoya (JP); Takayuki Fujikawa, Nagoya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 76 days.

(21) Appl. No.: 14/405,363

(22) PCT Filed: May 29, 2013

(86) PCT No.: PCT/JP2013/003395
§ 371 (c)(1),
(2) Date: Dec. 3, 2014

(87) PCT Pub. No.: WO2013/183253
PCT Pub. Date: Dec. 12, 2013

(65) Prior Publication Data
US 2015/0198802 A1 Jul. 16, 2015

(30) Foreign Application Priority Data
Jun. 5, 2012 (JP) .................................. 2012-128235

(51) Int. Cl.
*G02B 26/08* (2006.01)
*G02B 26/10* (2006.01)
(Continued)

(52) U.S. Cl.
CPC ............. *G02B 26/101* (2013.01); *B60K 35/00* (2013.01); *G02B 26/0883* (2013.01);
(Continued)

(58) Field of Classification Search
CPC .. G02B 26/10; G02B 26/101; G02B 26/105; G02B 26/123; G02B 26/0833; G02B 27/01; G02B 27/0101; G02B 2027/0159; G02B 2027/0114; G02B 27/0905; G02B 27/48; B60K 35/00; B60K 2350/2056; B60K 2350/2065
USPC ......... 359/199.1, 199.4, 200.8, 201.1–202.1, 359/204.1–205.1, 208.1, 211.1–211.2, 359/211.5, 618, 629–630, 741, 743; 345/7–8; 353/38
See application file for complete search history.

(56) References Cited

U.S. PATENT DOCUMENTS

2005/0237615 A1  10/2005  Urey et al.
2005/0248849 A1  11/2005  Urey et al.
(Continued)

FOREIGN PATENT DOCUMENTS

JP  2006047422 A  2/2006
JP  2006053495 A  2/2006
(Continued)

OTHER PUBLICATIONS

Office Action dated Dec. 16, 2015 issued in the corresponding Korean application No. 10-2014-7033832 in Korean with English translation.
(Continued)

*Primary Examiner* — James Phan
(74) *Attorney, Agent, or Firm* — Harness, Dickey & Pierce, P.L.C.

(57) ABSTRACT

A head-up display device including a screen member, a first generation portion, and a second generation portion is provided. The screen member is provided with multiple optical elements each of which has a curved surface portion and forms a scan surface by an array of the curved surface portions. The first generation portion generates a first laser beam that is irradiated to the scan surface to draw a display image. The second generation portion generates a second laser beam to draw a display image that is irradiated to the scan surface from a direction different from the first laser beam.

11 Claims, 11 Drawing Sheets

(51) Int. Cl.
  *G02B 27/01* (2006.01)
  *G02B 27/09* (2006.01)
  *G02B 27/48* (2006.01)
  *B60K 35/00* (2006.01)

(52) U.S. Cl.
  CPC ..... *G02B 27/0101* (2013.01); *G02B 27/0149* (2013.01); *G02B 27/0905* (2013.01); *G02B 27/48* (2013.01); *B60K 2350/2052* (2013.01); *G02B 2027/0114* (2013.01); *G02B 2027/0154* (2013.01); *G02B 2027/0159* (2013.01)

(56) References Cited

U.S. PATENT DOCUMENTS

| | | |
|---|---|---|
| 2006/0023164 A1 | 2/2006 | Sakaguchi et al. |
| 2006/0033009 A1 | 2/2006 | Kobayashi et al. |
| 2009/0067057 A1 | 3/2009 | Sprague et al. |
| 2009/0135374 A1 | 5/2009 | Horiuchi et al. |
| 2009/0201589 A1 | 8/2009 | Freeman |
| 2009/0219615 A1 | 9/2009 | Kageyama et al. |
| 2010/0046075 A1 | 2/2010 | Powell et al. |
| 2013/0050655 A1* | 2/2013 | Fujikawa ............ G02B 27/0101 353/38 |
| 2014/0177022 A1* | 6/2014 | Saisho ................ G02B 26/101 359/205.1 |

FOREIGN PATENT DOCUMENTS

| | | |
|---|---|---|
| JP | 2007523369 A | 8/2007 |
| JP | 2009128659 A | 6/2009 |
| JP | 2009205102 A | 9/2009 |
| JP | 2010152178 A | 7/2010 |
| JP | 2011166396 A | 8/2011 |
| JP | 2011170084 A | 9/2011 |
| JP | 2012003273 A | 1/2012 |

OTHER PUBLICATIONS

International Search Report and Written Opinion (in Japanese with English Translation) for PCT/JP2013/003395, mailed Jun. 25, 2013; ISA/JP.

Office Action in Corresponding JP Application No. 2012-128235 mailed Jul. 22, 2014 (Japanese with English Translation).

* cited by examiner

HEAD-UP DISPLAY DEVICE

CROSS-REFERENCE TO RELATED APPLICATIONS

This application is a U.S. National Phase Application under 35 U.S.C. 371 of International Application No. PCT/JP2013/003395 filed on May 29, 2013 and published in Japanese as WO 2013/183253 A1 on Dec. 12, 2013. This application is based on and claims the benefit of priority from Japanese Patent Application No. 2012-128235 filed on Jun. 5, 2012. The entire disclosures of all of the above applications are incorporated herein by reference.

TECHNICAL FIELD

The present disclosure relates to a head-up display device that projects a display image generated by scanning a laser beam and thereby makes a virtual image of the display image visible.

BACKGROUND ART

It is conventionally known that a head-up display device projects a display image onto a vehicle windshield and thereby makes a virtual image of the display image visible from a predetermined visual region. As one type of such a device, for example, Patent Literature 1 discloses a scanning beam head-up display device including a micro lens array having many small lenses and a beam generator to generate a laser beam that is irradiated to the micro lens array and draws a display image.

PRIOR ART LITERATURES

Patent Literature

Patent Literature 1: Japanese Translation of PCT Appln. No. 2007-523369 (corresponding to U.S. Patent Application Publication No. 20050237615)

SUMMARY OF INVENTION

When a scanning beam is irradiated to the micro lens array according to Patent Literature 1, the laser beam diffracted by one small lens interferes with the laser beam diffracted by another small lens adjacent to that small lens to increase the intensity. This causes unevenness in an intensity distribution of the laser beam reaching a visual region and consequently unevenness in a virtual image for a display image viewed by a viewer.

A configuration disclosed in Patent Literature 1 places a pair of micro lens arrays to face to each other. According to this configuration, the laser beam passing through one micro lens array is diffused by the other micro lens to uniform an uneven intensity distribution caused by the interference. However, the device according to Patent Literature 1 needs to use multiple micro lens arrays and accurately position them. The configuration of the micro lens array is inevitably complicated.

The present disclosure has been made in consideration of the foregoing. It is an object of the disclosure to provide a head-up display device capable of maintaining a simple configuration of a screen member such as a micro lens array and reducing an uneven virtual image caused by laser beam interference.

A head-up display device according to an example of the present disclosure projects a display image drawn on a scan surface by scanning a laser beam and makes a virtual image of the display image visible from a predetermined visual region. The head-up display device includes a screen member, a first generation portion, and a second generation portion. The screen member is provided with a plurality of optical elements each of which has a curved surface portion curved to spread a laser beam to the visual region. The scan surface is formed by an array of the curved surface portions of the optical elements. The first generation portion generates a first laser beam that is irradiated to the scan surface to draw the display image. The second generation portion generates a second laser beam to draw the display image that is irradiated to the scan surface from a direction different than the first laser beam.

According to the above-mentioned head-up display device, the direction to irradiate the first laser beam from the first generation portion differs from the direction to irradiate the second laser beam from the second generation portion. Therefore, a position to intensify the first laser beam diffracted by the curved surface portion due to interference may deviate from a position to intensify the second laser beam diffracted by the curved surface portion due to interference. When the first and second laser beams are overlapped each other, uneven brightness caused by one laser beam due to interference complements uneven brightness caused by the other laser beam due to interference to uniform the intensity distribution of laser beams reaching the visual region. Overlapping multiple laser beams irradiated from different irradiation directions can reduce an uneven virtual image caused by laser beam interference while maintaining a simple configuration of the screen member.

BRIEF DESCRIPTION OF DRAWINGS

The above and other objects, features, and advantages of the disclosure will be more apparent from the following detailed description with reference to the accompanying drawings in which.

EMBODIMENTS FOR CARRYING OUT INVENTION

Embodiments will be described in further detail with reference to the accompanying drawings. The same references may be used for the mutually corresponding elements in the embodiments to omit a duplicate description. A subsequent embodiment may describe only part of the configuration. In such a case, the other part of the configuration is applicable to the corresponding part of the configuration described in the preceding embodiment. Combinations of the configurations are not limited to those explicitly described in the embodiments. The configurations of the embodiments may be partially combined, even if not explicitly described, except an invalid combination.

First Embodiment

Figure 1:
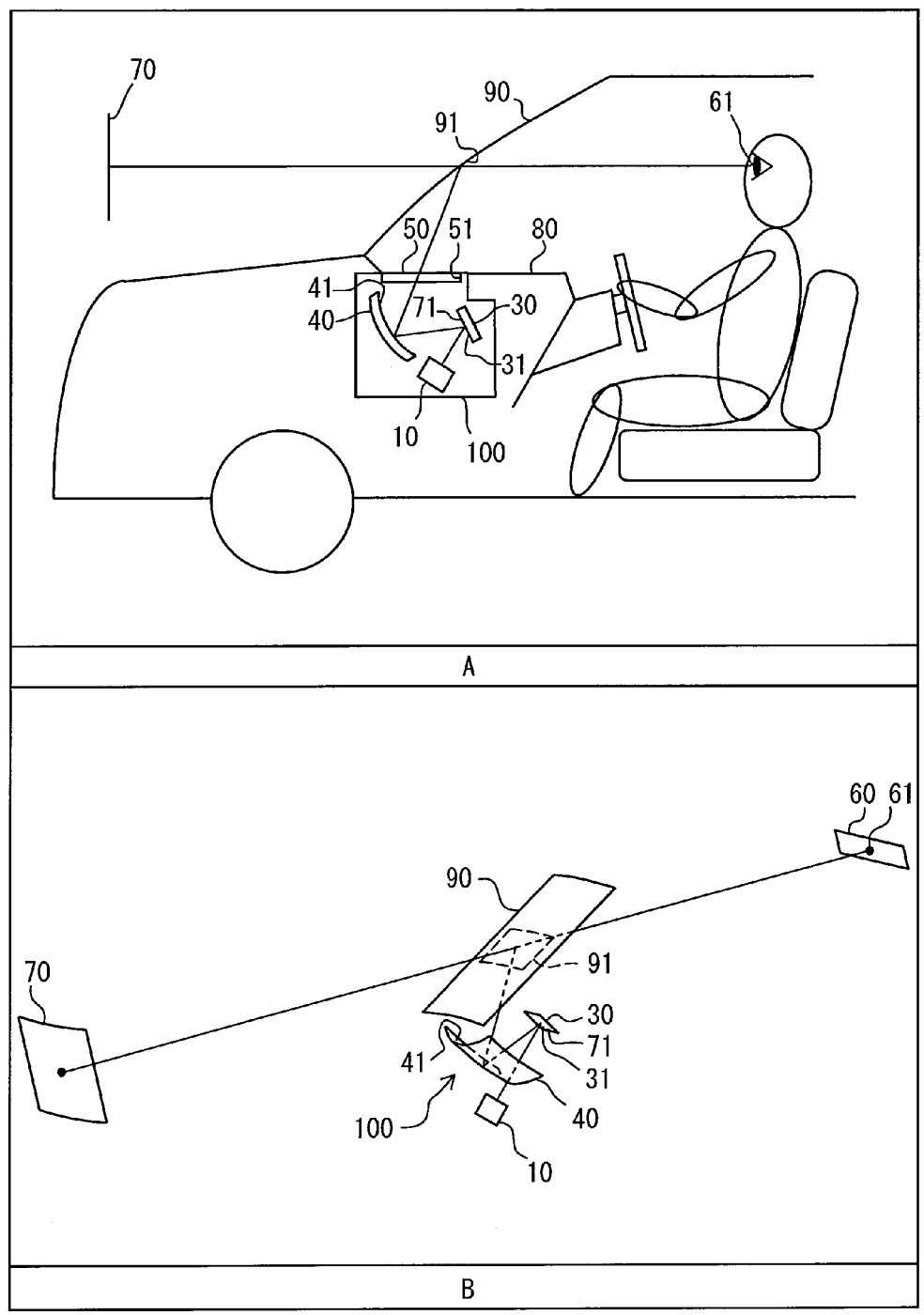
FIG. 1 is a diagram illustrating placement of a head-up display device according to a first embodiment in a vehicle.

Parts A and B in FIG. 1 illustrate a head-up display device 100 according to the first embodiment. The head-up display device 100 is contained in an instrument panel 80 of a vehicle, for example. A display image 71 penetrates a translucent dust prevention cover 50 that covers an aperture 51. The head-up display device 100 projects the display image 71 onto a display member such as a windshield 90 of the vehicle and allows a virtual image 70 of the display image 71 to be visible from a predetermined eye box 60. The eye box 60 is sized 100 through 200 millimeters horizontally and 40 through 90 millimeters vertically, for example. A projection plane 91 is formed on the surface of the windshield 90 on a vehicle compartment side. The head-up display device 100 projects the display image 71 onto the projection plane 91. The light of the display image 71 is projected onto the concavely curved projection plane 91 that then reflects the light to the eye box 60. The light reaches a viewer's eye point 61. The viewer to perceive the light of the display image 71 can view the virtual image 70 of the display image 71 formed ahead of the windshield 90. The display image 71 projected on the projection plane 91 is horizontally longer than the vehicle's vertical direction. This is because, in general, the viewer's eye point 61 can more easily move horizontally than vertically. The display image 71 contains a travel speed of the vehicle where the head-up display device 100 is mounted, an instruction about the travel direction supplied from the navigation system, and image part of a warning about the vehicle, for example.

(Basic Configuration)

The configuration of the head-up display device 100 will be described with reference to FIGS. 1 through 4. The head-up display device 100 illustrated in FIGS. 1 and 2 includes a laser scanner 10, a screen 30, and a concave mirror 40.

The screen 30 is placed between the laser scanner 10 and the projection plane 91. The laser scanner 10 is positioned opposite the projection plane 91 in the vertical position and includes a light source portion 13, an optical portion 20, a Micro Electro Mechanical Systems (MEMS) mirror portion 26, and a controller 11.

The light source portion 13 includes three laser irradiation portions 14, 15, and 16. The laser irradiation portions 14, 15, and 16 irradiate laser beams of different frequencies, i.e., different hues. Specifically, the laser irradiation portion 14 irradiates a red laser beam. The laser irradiation portion 15 irradiates a blue laser beam. The laser irradiation portion 16 irradiates a green laser beam. Various colors can be represented by mixing the laser beams of different hues. The laser irradiation portions 14, 15, and 16 are connected to the controller 11. The laser irradiation portions 14, 15, and 16 irradiate laser beams of the corresponding hues based on a control signal from the controller 11.

The optical portion 20 includes three collimation lenses 21, dichroic filters 22, 23, 24, and a condenser lens 25. The collimation lenses 21 are placed along the directions of laser beams irradiated from the laser irradiation portions 14, 15, and 16. The collimation lens 21 refracts a laser beam to generate parallel light.

The dichroic filters 22, 23, and 24 are positioned along corresponding irradiation directions for the laser irradiation portions 14, 15, 16. The collimation lenses 21 are positioned between the dichroic filters and the laser irradiation portions. The dichroic filter 22 is placed along the irradiation direction for the laser irradiation portion 14. The dichroic filter 22 transmits the light of a frequency corresponding to red and reflects the light of the other frequencies. The dichroic filter 23 is placed along the irradiation direction for the laser irradiation portion 15. The dichroic filter 23 transmits the light of a frequency corresponding to blue and reflects the light of the other frequencies. The dichroic filter 24 is placed along the irradiation direction for the laser irradiation portion 16. The dichroic filter 24 transmits the light of a frequency corresponding to green and reflects the light of the other frequencies. Laser beams irradiated from the laser irradiation portions 14, 15, and 16 reach the condenser lens 25 under the action of the dichroic filters 22, 23, and 24.

The condenser lens 25 is a plano-convex lens having a flat incident surface and a convex exit surface. The condenser lens 25 refracts the laser beam incident on the incident surface to converge the laser beam. The laser beam passing through the condenser lens 25 thereby condenses on a scan surface 31 (to be described) of the screen 30.

The MEMS mirror portion 26 includes a scanner and a mirror to be described later in detail and reflects the laser beam to the screen 30. The MEMS mirror portion 26 is connected to the controller 11. The controller 11 is a control unit including a processor and is connected to the laser irradiation portions 14, 15, 16 as well as the MEMS mirror portion 26. The controller 11 outputs a control signal to the laser irradiation portions 14, 15, 16 to intermittently activate the laser beam like a pulse of light. In addition, the controller 11 outputs a drive signal to the MEMS mirror portion 26 and thereby controls the direction of the laser beam reflected on the mirror portion 26 so as to conform to a scan line SL illustrated in FIG. 2.

Under control of the controller 11, the laser scanner 10 according to the above-mentioned configuration projects the light to be formed as the display image 71 on the scan surface 31 (to be described) of the screen 30. Specifically, scanning spotted light emission due to the projected laser beam draws and images the display image 71 on the scan surface 31 of the screen 30 assuming that the display image 71 is formed of the spotted light emission as a pixel.

Figure 3:
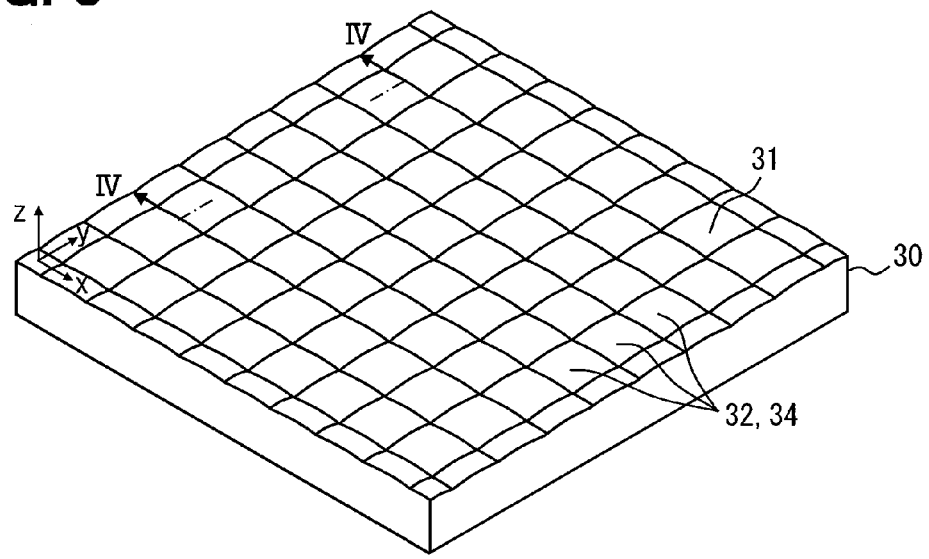
FIG. 3 is a diagram schematically illustrating the configuration of a micro mirror array used as a screen for the head-up display device.
Figure 4:
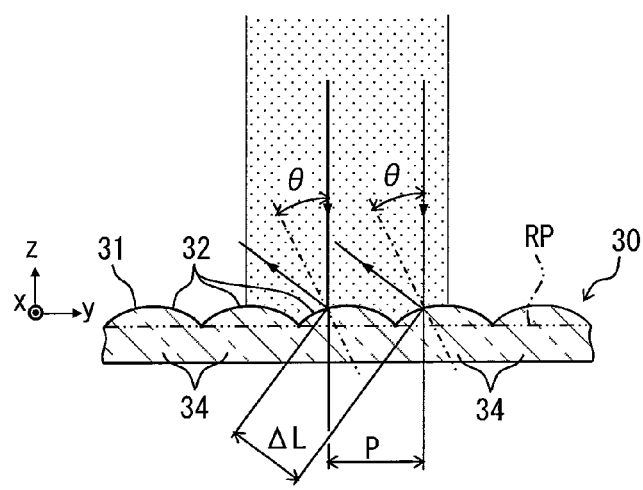
FIG. 4 is a diagram illustrating a condition of laser beam interference due to diffraction and corresponds to a cross sectional view taken along lines IV-IV of FIG. 3.

The screen 30 illustrated in FIGS. 3 and 4 is a reflective screen formed by depositing aluminum on the surface of a glass substrate, for example. The screen 30 provides a so-called micro mirror array including multiple fine micro mirrors 34 that are substantially arrayed at regular intervals in x-axis and y-axis directions along virtual reference plane RP. For example, a metal thin film of deposited aluminum forms the scan surface 31 of the screen 30. Each micro mirror 34 includes a convexly curved portion 32 that is curved to reflect and diffract the laser beam toward a reflection surface 41 (see part A of FIG. 1) and spread the laser beam toward the eye box 60 (see part B of FIG. 1). An array of convexly curved portions 32 forms the scan surface 31.

As illustrated in FIG. 1, depositing aluminum on the surface of a glass substrate forms the concave mirror 40. The concave mirror 40 is positioned in the horizontal direction of the screen 30. The concave mirror 40 includes the reflection surface 41 that reflects the laser beam reflected on the scan surface 31 of the screen 30 to the projection plane 91 of the windshield 90. The reflection surface 41 smoothly curves to be concaved in the direction that allows the center of the reflection surface 41 to recede from the scan surface 31 and the projection plane 91. The reflection surface 41 enlarges and reflects the display image 71 reflected on the scan surface 31 and thereby projects the display image 71 onto the projection plane 91. The display image 71 has different magnification percentages in the horizontal and vertical directions of the display image 71 due to the curved reflection surface 41. Specifically, the magnification percentage in the horizontal direction is larger than the magnification percentage in the vertical direction so that the reflection surface 41 enlarges the display image 71 horizontally more than vertically.

(Specific Configuration)

Figure 2:
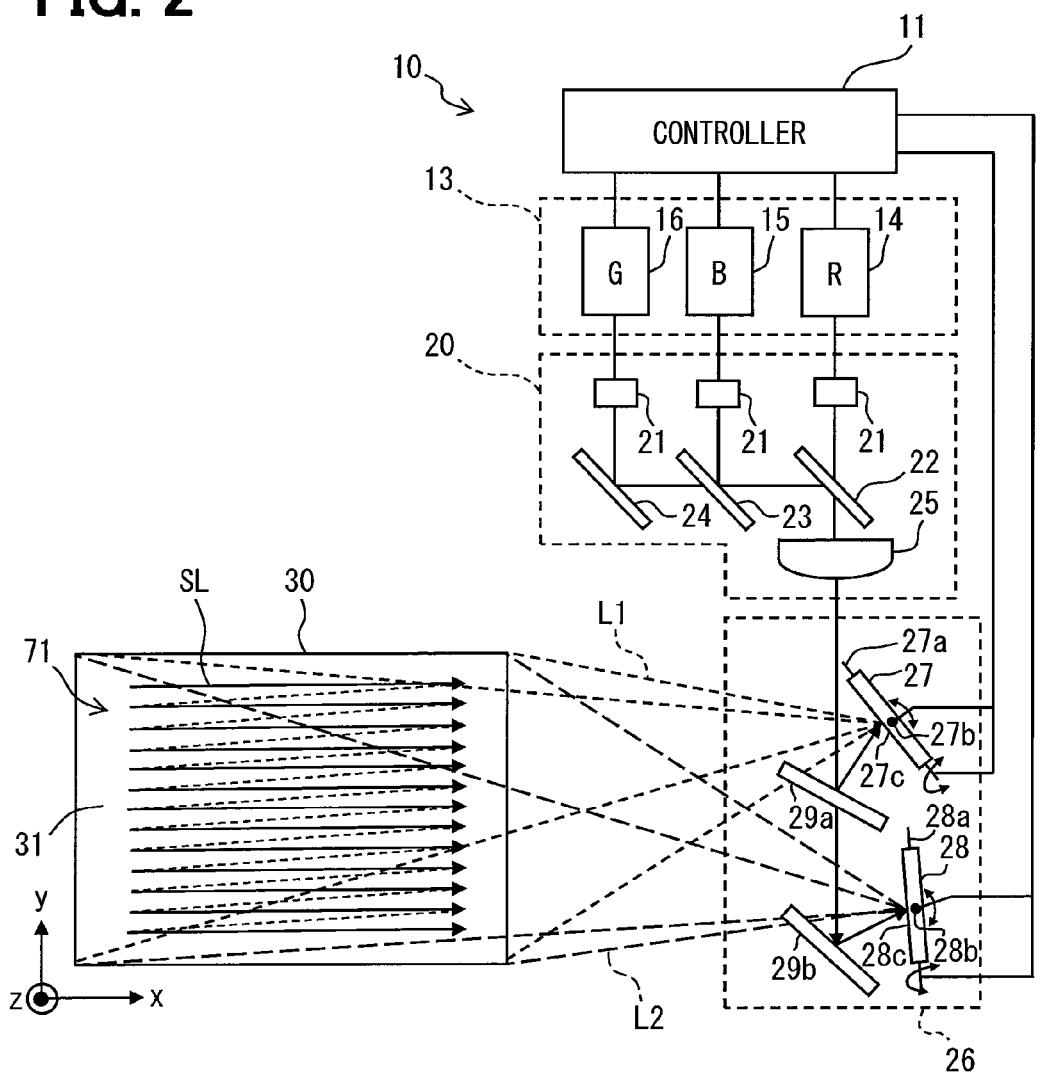
FIG. 2 is a diagram illustrating in detail the configuration and operation of a laser scanner.
Figure 5:
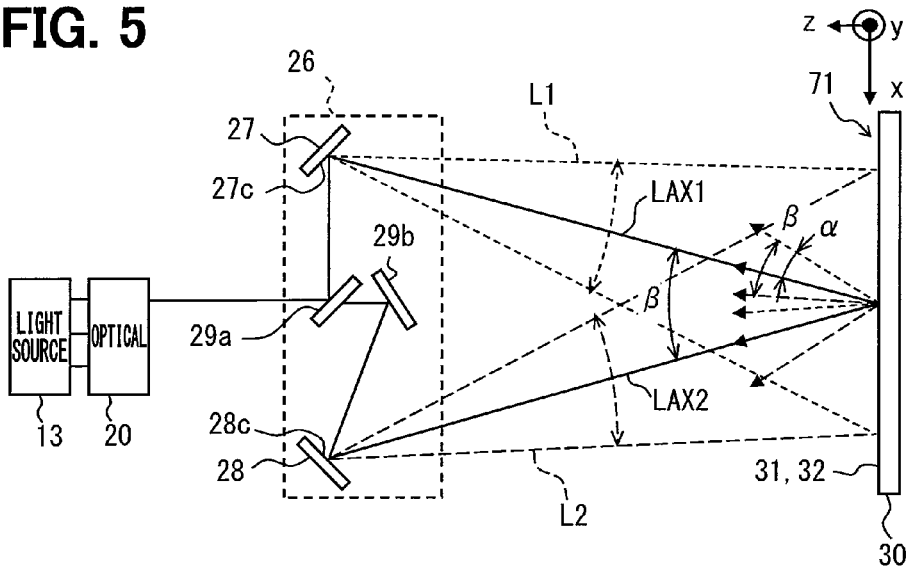
FIG. 5 is a diagram illustrating in detail the configuration and function of a MEMS mirror portion according to the first embodiment.

The following describes a specific configuration of the head-up display device 100 according to the first embodiment. As illustrated in FIGS. 2 and 5, the MEMS mirror portion 26 irradiates a first laser beam L1 and a second laser beam L2 to the scan surface 31 in order to draw the display image 71. The first laser beam L1 and the second laser beam L2 are irradiated to the scan surface 31 from different directions. The configuration of the MEMS mirror portion 26 will be described in detail below.

The MEMS mirror portion 26 includes a half mirror 29a, a mirror reflector 29b, a first scanner 27, and a second scanner 28. Depositing aluminum on the surface of a glass substrate forms the half mirror 29a and the mirror reflector 29b. The half mirror 29a has the function to reflect and transmit the incident light substantially at a rate of 1:1. The half mirror 29a is positioned so that its reflection surface faces the optical portion 20 and the first scanner 27. The half mirror 29a reflects approximately half the laser beam irradiated from the optical portion 20 to the first scanner 27 and transmits approximately half the same laser beam to the mirror reflector 29b. The mirror reflector 29b is positioned so that its reflection surface faces the half mirror 29a and the second scanner 28. The mirror reflector 29b reflects the laser beam penetrating the half mirror 29a to the second scanner 28. The half mirror 29a and the mirror reflector 29b split the laser beam irradiated from the light source portion 13 and the optical portion 20 and irradiate the split laser beam to the scanners 27 and 28.

The first scanner 27 and the second scanner 28 are provided with MEMS reflection surfaces 27c and 28cb respectively. Each MEMS reflection surface 27c, 28cb contains a metal thin film formed by depositing aluminum. The first scanner 27 is positioned so that the MEMS reflection surface 27c faces the half mirror 29a and the screen 30. A rotation axis 27a extends vertically. A rotation axis 27b extends horizontally. The rotation axes 27a and 27b support the MEMS reflection surface 27c so that the MEMS reflection surface 27c is capable of rotational displacement around the rotation axes 27a and 27b. The second scanner 28 is positioned so that the MEMS reflection surface 28c faces the mirror reflector 29b and the screen 30. A rotation axis 28a extends vertically. A rotation axis 28b extends horizontally. The rotation axes 28a and 28b support the MEMS reflection surface 28c so that the MEMS reflection surface 28c is capable of rotational displacement around the rotation axes 28a and 28b. A drive portion is provided for each of the scanners 27 and 28 and rotationally displaces the MEMS reflection surfaces 27c and 28c around the corresponding rotation axes 27a, 27b, 28a, and 28b based on a drive signal from the controller 11. The laser beam reflected on each of the MEMS reflection surfaces 27c and 28c thereby draws the display image 71 on the scan surface 31. The following description assumes that the first scanner 27 irradiates the first laser beam L1 to the scan surface 31 and the second scanner 28 irradiates the second laser beam L2 to the scan surface 31.

The following describes how the first laser beam L1 and the second laser beam L2 described above reduce uneven brightness of the virtual image 70. The first topic describes why the virtual image 70 of the display image 71 causes uneven brightness.

As illustrated in FIG. 4, the diameter of the laser irradiated to the scan surface 31 is larger than one micro mirror 34. The screen 30 has the scan surface 31 including an array of substantially equally shaped micro mirrors 34. There are formed adjacent convexly curved portions 32 whose normal directions match. Accordingly, the laser beams irradiated to the scan surface 31 are partially reflected and diffracted in the same direction from the adjacent micro mirrors 34. The laser beams intensify each other due to interference if optical path difference ΔL between the laser beams reflected in the same direction satisfies the condition of equation 1 below.

$$\Delta L = P \times \sin(2\theta) = n \times \lambda \quad \text{(Equation 1)}$$

Figure 6:
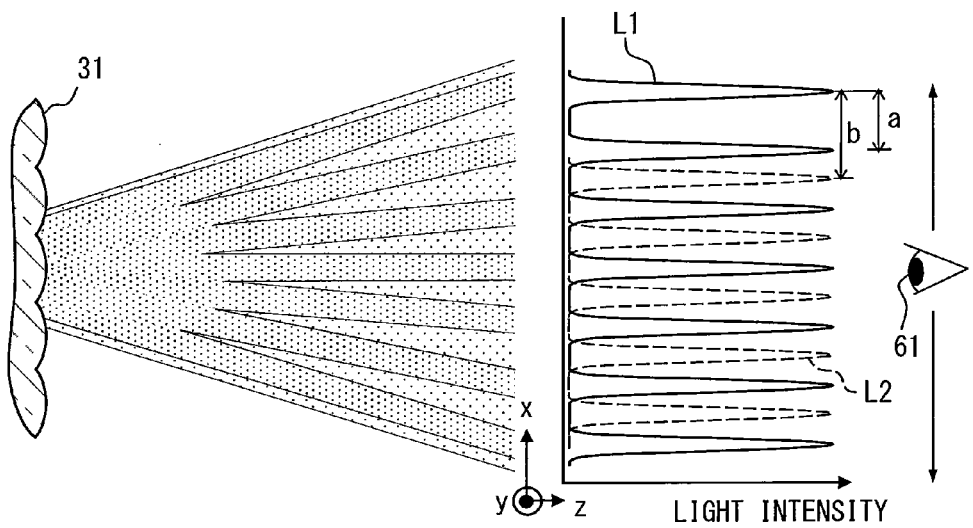
FIG. 6 is a diagram schematically illustrating the intensity distribution of brightness in a viewed virtual image according to the first embodiment.

In equation 1, P is a pitch between adjacent micro mirrors 34; θ is an incident angle of the laser beam; λ is a wavelength of the laser beam; and n is an order. The scan surface 31 is configured to include the micro mirrors 34 that are substantially arrayed at the same pitch. As illustrated in FIG. 6, portions where the laser beams are intensified due to interference appear at a specified interval (see the solid line in FIG. 6) in the x-axis and y-axis directions. Suppose that "a" is an interval between portions where the laser beams are intensified due to interference between the orders of the laser beams. Interference interval "a" may be larger than the diameter (approximately 2 millimeters) of the viewer's pupil if large pitch P exists between the adjacent micro mirrors 34.

Moving the eye point 61 varies the intensity of the light perceived by the viewer depending on positions of the eye point 61.

The first laser beam L1 and the second laser beam L2 will be described in more detail. As illustrated in FIG. 5, a first optical axis line LAX1 of the first laser beam L1 intersects with a second optical axis line LAX2 of the second laser beam L2 at an angle β. Suppose that "α" is an angle between the portions where the laser beams diffracted by the convexly curved portions 32 are intensified due to interference between the orders of the laser beams. Then, an intersection angle β formed by the optical axis lines LAX1 and LAX2 differs from an interference angle α. Specifically, the intersection angle β is favorably settled to be equal to the interference angle α multiplied by (m+Δ), where m is an integer and Δ is a value ranging from ⅓ to ⅔. The first embodiment settles the intersection angle β to be equal to the interference angle α multiplied by (m+½). Based on the above-mentioned condition, the direction (see the short broken line in FIG. 5) intensified by the first laser beam L1 due to interference deviates approximately α/2 from the direction (see the long broken line in FIG. 5) intensified by the second laser beam L2 due to interference.

The first embodiment settles the intersection angle β along the zx plane. Accordingly, as illustrated in FIG. 6, the position (see the solid line in FIG. 6) intensified by the first laser beam L1 due to interference deviates from the position (see the long broken line in FIG. 6) intensified by the second laser beam L2 due to interference by intersection spacing "b" along the x-axis direction. Intersection spacing "b" is a value dependent on the intersection angle β (see FIG. 5). The above-mentioned interference interval "a" is a value dependent on the interference angle α (see FIG. 5). The intersection angle β differs from the interference angle α. Accordingly, intersection spacing "b" differs from interference interval "a". Supposing the intersection angle β is settled to (m+½)α, each position intensified by the second laser beam L2 due to interference is located between positions intensified by the first laser beam L1 due to interference.

Figure 7:
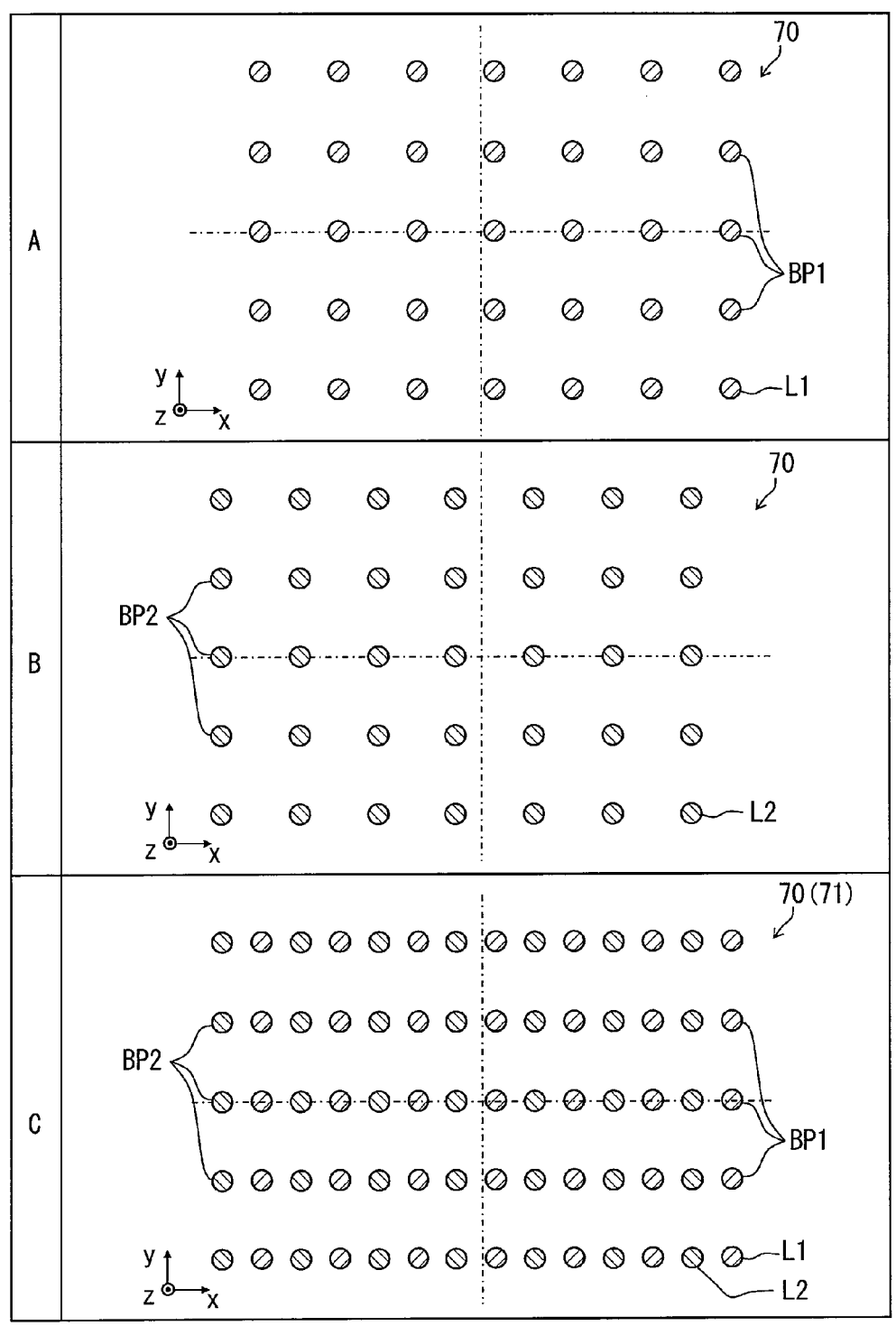
FIG. 7 is a diagram schematically illustrating the mechanism of uniforming uneven brightness of a virtual image by overlapping first and second laser beams each other.

With reference to FIG. 7, the following describes in more detail the virtual image 70 of the display image 71 resulting from the first laser beam L1 and the second laser beam L2 described so far. Interference of the first laser beam L1 causes a spot-shaped bright portion BP1 in the virtual image 70. As illustrated in a part A of FIG. 7, the bright portions BP1 occur in a cyclic pattern in the x-axis and y-axis directions. On the other hand, interference of the second laser beam L2 causes a spot-shaped bright portion BP2. As illustrated in part B of FIG. 7, the bright portions BP2 also occur in a cyclic pattern in the x-axis and y-axis directions of the virtual image 70. The bright portion BP1 resulting from the first laser beam L1 deviates from the bright portion BP2 resulting from the second laser beam L2 in the x-axis direction. As illustrated in part C of FIG. 7, overlapping the first laser beam L1 and the second laser beam L2 each other allows the uneven brightness caused by interference of one laser beam to complement the uneven brightness caused by interference of the other laser beam. This uniforms the intensity distribution of laser beams reaching the eye box 60 (see part B of FIG. 1). Overlapping the first laser beam L1 and the second laser beam L2 each other makes it possible to reduce uneven brightness of the virtual image 70 due to interference of laser beams while maintaining the simple configuration of the screen 30 (see FIG. 3).

In addition, according to the first embodiment, the position for intensification by the first laser beam L1 due to interference certainly deviates from the position for intensification by the second laser beam L2 due to interference because the intersection angle β is settled to be equal to the interference angle α multiplied by (m+Δ). There is increasing certainty that the uneven brightness resulting from one laser beam complements the uneven brightness from the other laser beam.

The magnification percentage of the concave mirror 40 according to the first embodiment is settled to be larger in the x-axis direction than in the y-axis direction because the eye box 60 is horizontally long. For this reason, interference interval "a" tends to be longer in the x-axis direction than in the y-axis direction. To address this, the first embodiment settles the intersection angle β along the zx plane to shift the bright portions BP1 and BP2 of the laser beams L1 and L2 in the x-axis direction. This can effectively reduce uneven brightness in the virtual image 70 in the x-axis direction where the uneven brightness is easily noticeable.

According to the first embodiment, the half mirror 29a and the mirror reflector 29b split laser beams irradiated from the light source portion 13 and the optical portion 20. This can generate the laser beams L1 and L2 while preventing the configuration of the MEMS mirror portion 26 from being complicated. It is possible to prevent the configuration of the MEMS mirror portion 26 as well as the screen 30 from being complicated and thereby further improve the capability of reducing uneven brightness in the virtual image 70 in the head-up display device 100.

In the first embodiment, the light source portion 13 and the optical portion 20 in cooperation can correspond to a laser beam irradiation portion (means). The half mirror 29a and the mirror reflector 29b in cooperation can correspond to a split portion (means). The first scanner 27 can correspond to a first generation portion (means). The second scanner 28 can correspond to a second generation portion (means). The screen 30 can correspond to a screen member. The micro mirror 34 can correspond to an optical element. The convexly curved portion 32 can correspond to a curved surface portion. The eye box 60 can correspond to a visual region.

Second Embodiment

Figure 8:
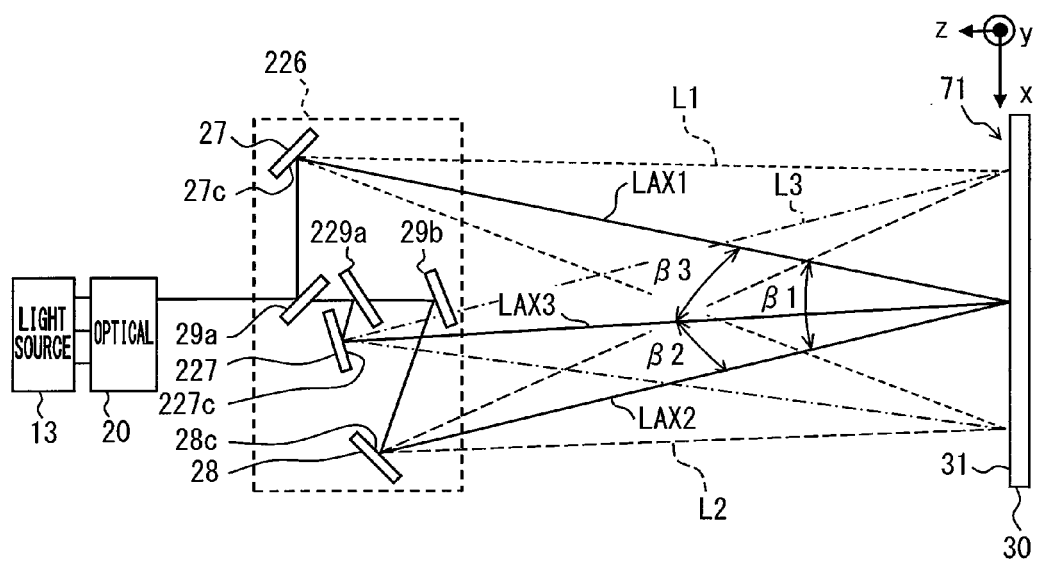
FIG. 8 is a diagram illustrating in detail the configuration and function of a MEMS mirror portion according to a second embodiment.
Figure 9:
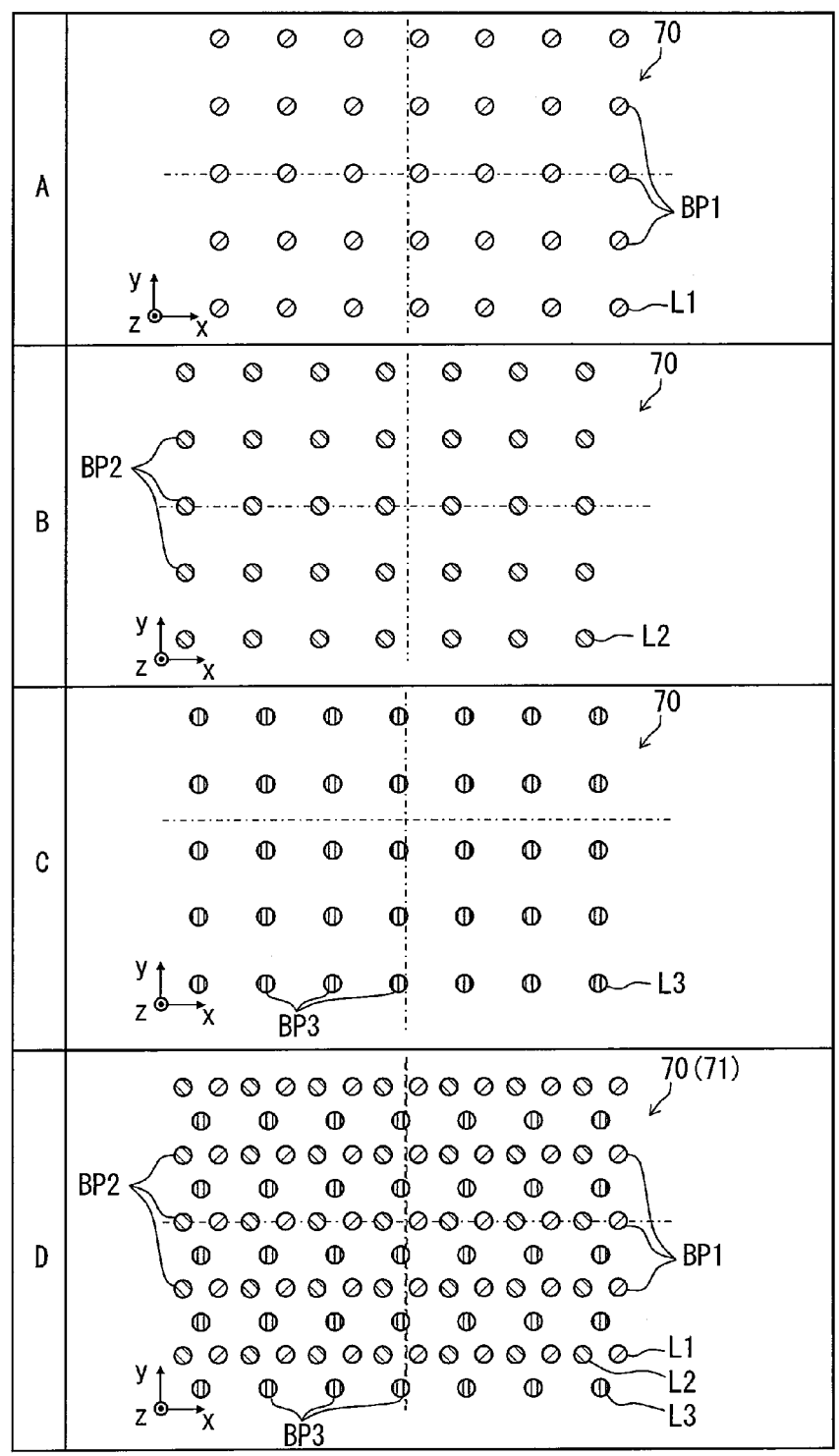
FIG. 9 is a diagram schematically illustrating the mechanism of uniforming uneven brightness of a virtual image by overlapping first through third laser beams each other.

The second embodiment illustrated in FIGS. 8 and 9 is a modification of the first embodiment. As illustrated in FIG. 8, a MEMS mirror portion 226 according to the second embodiment includes half mirrors 29a and 229a, the mirror reflector 29b, the first scanner 27, the second scanner 28, and a third scanner 227. The half mirror 29a reflects approximately one third of a laser beam irradiated from the optical portion 20 to the first scanner 27 and transmits the remainder, i.e., approximately two thirds of the laser beam to the half mirror 229a. The half mirror 229a is configured to be substantially equal to the half mirror 29a and is placed so that the reflection surface faces the mirror 29a and the third scanner 227. The half mirror 229a reflects approximately half the laser beam penetrating the half mirror 29a to the third scanner 227 and transmits the remainder, i.e., approximately half the laser beam to the mirror reflector 29b. The half mirror 29a and 229a and the mirror reflector 29b described above split the laser beam irradiated from the light source portion 13 and the optical portion 20 and irradiate the laser beam to the scanners 27, 28, and 227.

The third scanner 227 is configured to be substantially equal to the first and second scanners 27 and 28. The third scanner 227 is supported by a vertically extending rotation axis and a horizontally extending rotation axis and includes a MEMS reflection surface 227c capable of rotational displacement around the rotation axes. The third scanner 227 is placed so that the reflection surface 227c faces the half mirror 229a and the screen 30. The third scanner 227 is positioned to deviate from the plane that contains the first optical axis line LAX1 and the second optical axis line LAX2. The third scanner 227 irradiates a laser beam (hereinafter referred to as a "third laser beam L3") to the scan surface 31. The third laser beam L3 is irradiated from a direction different from the directions of the first laser beam L1 and the second laser beam L2. Each of the laser beams L1 through L3 reflected on the MEMS reflection surfaces 27c, 28c, and 227c thereby draws the display image 71 on the scan surface 31.

In the above-mentioned configuration, the intersection angle β1 is assumed between the first optical axis line LAX1 of the first laser beam L1 and the second optical axis line LAX2 of the second laser beam L2. An intersection angle β2 is assumed between the second optical axis line LAX2 of the second laser beam L2 and a third optical axis line LAX3 of the third laser beam L3. An intersection angle β3 is assumed between the third optical axis line LAX3 of the third laser beam L3 and the first optical axis line LAX1 of the first laser beam L1. Similarly to β according to the first embodiment, the intersection angle β1 is settled along the zx plane. Different from the intersection angle β1, intersection angles β2 and β3 are settled on a plane intersecting with the zx plane. The plane to settle the intersection angle β2 intersects with the plane to settle the intersection angle β3.

With reference to FIG. 9, the following describes in more detail the virtual image 70 of the display image 71 resulting from the laser beams L1 through L3 described so far. As illustrated in part C of FIG. 9, interference of the third laser beam L3 causes a spot-shaped bright portion BP3 similarly to the bright portions BP1 and BP2 due to the first and second laser beams L1 and L2 illustrated in parts A and B of FIG. 9. The bright portions BP3 also occur in a cyclic pattern in the x-axis and y-axis directions of the virtual image 70. As illustrated in parts A and B of FIG. 9, the bright portions BP1 and BP2 resulting from the first and second laser beams L1 and L2 deviate from each other in the x-axis direction similarly to the first embodiment. The bright portion BP3 resulting from the third laser beam L3 illustrated in part C of FIG. 9 deviates from the bright portions BP1 and BP2 illustrated in parts A and B of FIG. 9 in the x-axis direction and the y-axis direction, respectively. As illustrated in part D of FIG. 9, overlapping the laser beams L1 through L3 places the bright portion BP3 between a pair of adjacent bright portions BP1 in the y-axis direction and between adjacent bright portions BP1 and BP2 in the x-axis direction.

Arraying the bright portions BP1 through BP3 allows uneven brightness caused by interference of the laser beams L1 through L3 to complement each other. This uniforms the intensity distribution of laser beams reaching the eye box 60 (see part B of FIG. 1). Accordingly, the second embodiment can also reduce uneven brightness of the virtual image 70 while maintaining the simple configuration of the screen 30 (see FIG. 3).

In addition, the second embodiment deviates the third scanner 227 from the plane containing the first and second optical axis lines LAX1 and LAX2. The bright portion BP3 resulting from the third laser beam L3 may thereby deviate from the bright portions BP1 and BP2 resulting from the first and second laser beams L1 and L2 in the y-axis direction. The bright portion BP3 resulting from the third laser beam L3 is placed at a position where merely overlapping the first and second laser beams L1 and L2 leaves the brightness liable to be insufficient. This can further reduce uneven brightness in the virtual image 70.

In the second embodiment, the half mirrors 29a and 229a and the mirror reflector 29b in cooperation can correspond to a split portion (means). The third scanner 227 can corresponds to a third generation portion.

Third Embodiment

The third embodiment illustrated in FIGS. 10 through 14 is another modification of the first embodiment. In a laser scanner 310 illustrated in FIG. 10, a MEMS mirror portion 326 includes a horizontal scanner 327 and a vertical scanner 328 connected to the controller 11. The horizontal scanner 327 and the vertical scanner 328 are provided with rotation axes 327a and 328a and MEMS reflection surfaces 327b and 328b, respectively. The MEMS reflection surfaces 327b and 328b each contain a metal thin film formed by depositing aluminum.

The horizontal scanner 327 is placed so that the reflection surface 327b faces the optical portion 20 and the vertical scanner 328. Based on a drive signal from the controller 11, the horizontal scanner 327 rotationally displaces the MEMS reflection surface 327b around the rotation axis 327a. The vertical scanner 328 is placed so that the MEMS reflection surface 328b faces the MEMS reflection surface 327b of the horizontal scanner 327 and a screen 330. Based on a drive signal from the controller 11, the vertical scanner 328 rotationally displaces the MEMS reflection surface 328b around the rotation axis 328a. The rotational displacement of the MEMS reflection surfaces 327b and 328b controls directions of the laser beam reflecting on the reflection surfaces 327b and 328b as illustrated by the scan line SL.

Figure 13:
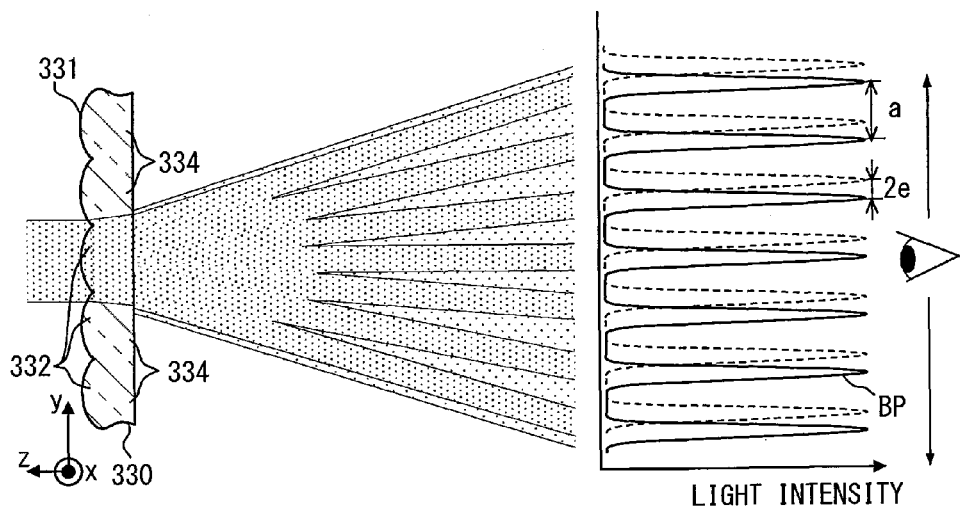
FIG. 13 is a diagram schematically illustrating the intensity distribution of brightness in a viewed virtual image according to the third embodiment.

The screen 330 represents a transmissive screen made of glass. As illustrated in FIG. 13, the screen 330 provides a so-called micro lens array including multiple fine micro lenses 334 that are substantially arrayed at regular intervals in x-axis and y-axis directions. Each micro lens 334 includes a convexly curved portion 332. The convexly curved portion 332 is curved so as to transmit and diffract a laser beam to the reflection surface 41 (see part A of FIG. 1) and spread the laser beam to the eye box 60 (see part B of FIG. 1). A scan surface 331 of the screen 330 is formed to include an array of convexly curved portions 332 and faces the MEMS mirror portion 326 (see FIG. 10).

Figure 10:
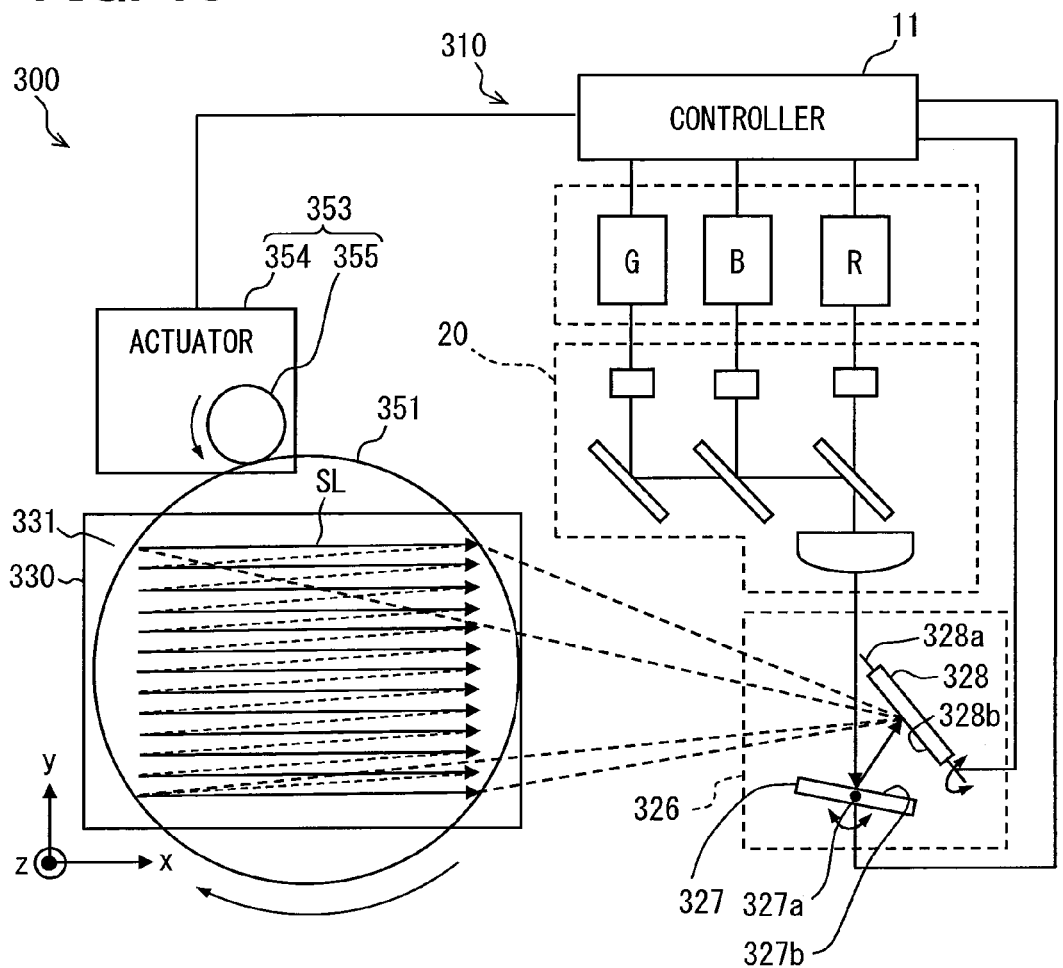
FIG. 10 is a diagram illustrating in detail the configuration of a wedge prism and a rotation mechanism according to a third embodiment.
Figure 11:
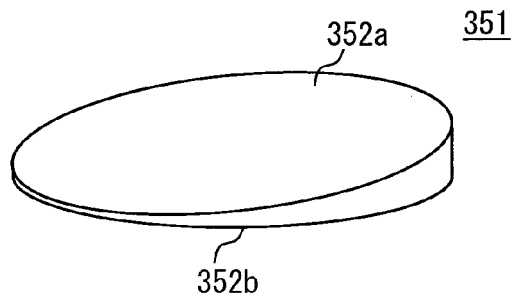
FIG. 11 is a perspective view illustrating the wedge prism shape.
Figure 12:
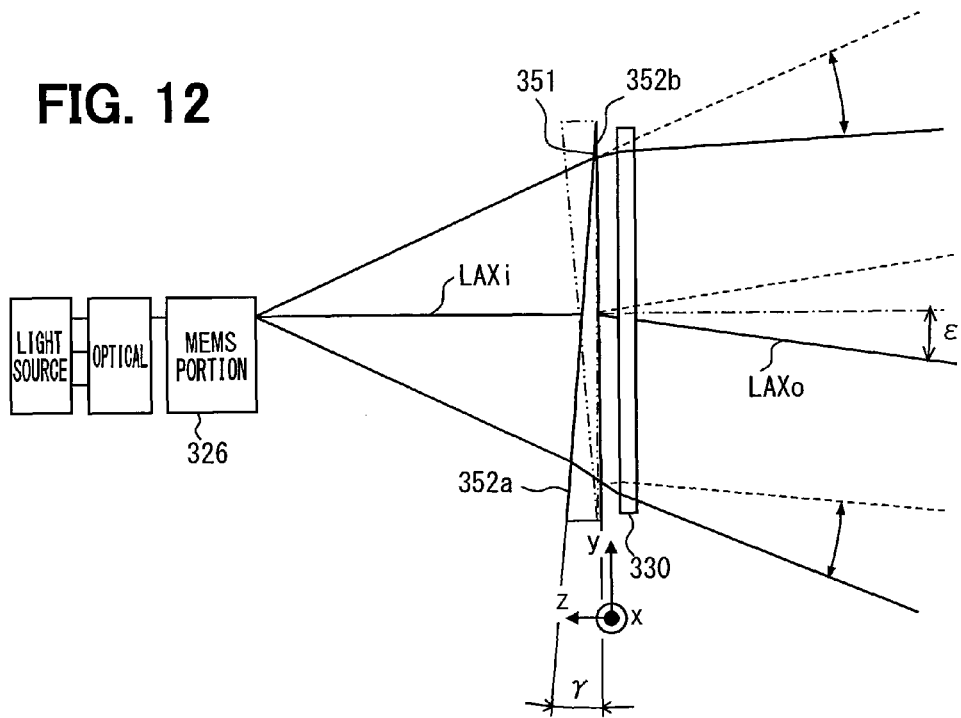
FIG. 12 is a diagram illustrating in detail the function of the wedge prism and the rotation mechanism according to the third embodiment.

A head-up display device 300 illustrated in FIG. 10 includes a wedge prism 351 and a rotation mechanism 353 to generate laser beams irradiated to the scan surface 331 from multiple directions like the first and second laser beams L1 and L2 (see FIG. 5) according to the first embodiment. As illustrated in FIGS. 11 and 12, the wedge prism 351 is a disklike transmissive member made of glass. The wedge prism 351 is positioned between the MEMS mirror portion 326 and the screen 330 and is oriented so that the center axis direction follows an incident light axis line LAXi of a laser beam reflected from the MEMS mirror portion 326 to the screen 330. The wedge prism 351 is rotatably supported in a circumferential direction by a chassis (not shown) of the head-up display device 300 (see FIG. 10). The wedge prism 351 has a top surface 352a and a bottom surface 352b. The top surface 352a is positioned to tilt against an orthogonal plane perpendicular to the incident light axis line LAXi and refracts a laser beam. The bottom surface 352b is positioned along the orthogonal plane perpendicular to the incident light axis line LAXi and the xy plane of the screen 330. An angle between the bottom surface 352b and the top surface 352a corresponds to a vertex angle λ illustrated in FIG. 12.

The wedge prism 351 uses the top surface 352a and the bottom surface 352b to deflect a laser beam irradiated from the MEMS mirror portion 326 to the screen 330.

The rotation mechanism 353 illustrated in FIG. 10 includes an actuator 354 and a drive portion 355. The actuator 354 is connected to the controller 11 and rotates an output axis based on a drive signal from the controller 11. The drive portion 355 rotates along with the output axis of the actuator 354 to transmit the output axis rotation to the wedge prism 351. The rotation mechanism 353 rotates the wedge prism 351 at a rotation speed of 30 revolutions per second or more. This continuously varies the orientation of the top surface 352a (see FIG. 12) of the wedge prism 351. As described above, the rotation mechanism 353 continuously varies the deflection angle direction to deflect a laser beam irradiated from the wedge prism 351 and eventually the orientation of exit light axis line LAXo (see FIG. 12) with the lapse of time. The rotation mechanism 353 and the wedge prism 351 cooperate with each other to generate laser beams that vary with time in directions of the laser beams irradiated to the scan surface 331.

For descriptive purposes, suppose a deflection angle $\epsilon$ between the incident light axis line LAXi and the exit light axis line LAXo as illustrated in FIG. 12. Then, the deflection angle $\epsilon$ approximately is equal to an integer multiple of the vertex angle $\lambda$ of the wedge prism 351. Doubling the deflection angle $\epsilon$ is configured to differ from the interference angle $\alpha$ (see FIG. 5). Specifically, the deflection angle $\epsilon$ is favorably settled to be equal to the interference angle $\alpha$ multiplied by $\{(m+\Delta)/2\}$, where m is an integer and $\Delta$ is a value ranging from ⅓ to ⅔. The third embodiment settles the deflection angle $\epsilon$ to be equal to the interference angle $\alpha$ multiplied by $\{(m+½)/2\}$. The direction of a laser beam to be intensified due to interference temporally continuously varies around the incident light axis line LAXi with an amplitude of deflection angle $\epsilon$.

Figure 14:
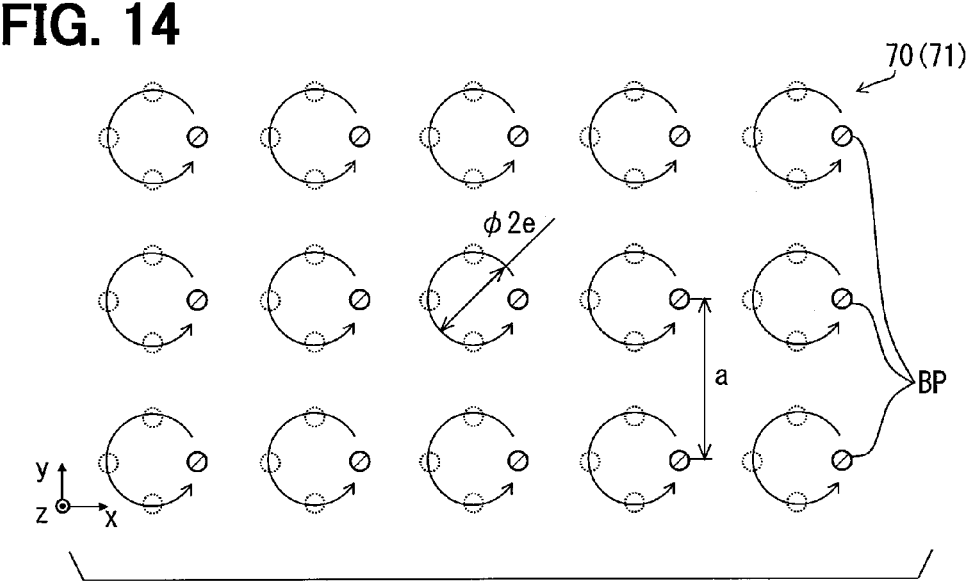
FIG. 14 is a diagram schematically illustrating the mechanism of circularly moving a bright portion caused by diffraction interference of a laser beam and thereby uniforming uneven brightness of a virtual image.

According to the above-mentioned configuration, interference of the laser beam causes a spot-shaped bright portion BP as illustrated in FIGS. 13 and 14. The bright portion BP cyclically moves while drawing a circular trajectory whose deflection radius is "e". Deflection radius "e" depends on the deflection angle $\epsilon$ (see FIG. 12). Deflection radius "e" is approximately one fourth of interference interval "a" that depends on the interference angle $\alpha$.

According to the third embodiment described so far, laser beams intensify each other due to interference at the bright portion BP that makes a round of the circular trajectory in one thirtieth of a second. The bright portion BP is moved in a time too short to be perceived by the viewer. The viewer perceives the virtual image 70 of the display image 71 as if the virtual image 70 were made of overlapping laser beams irradiated from multiple directions. Uneven brightnesses resulting from interference of laser beams move to complement each other and thereby uniform intensity distributions of the laser beams reaching the eye box 60 (see part B of FIG. 1). Accordingly, the third embodiment can also reduce uneven brightness of the virtual image 70 resulting from interference of laser beams while maintaining the simple configuration of the screen 330 (see FIG. 13).

In addition, the third embodiment settles the deflection angle $\epsilon$ to be equal to the interference angle $\alpha$ multiplied by $\{(m+\Delta)/2\}$. As a result, the trajectory of a moving bright portion BP does not overlap trajectories of the other adjacent bright portions BP. Uneven brightnesses resulting from interference of laser beams move to more effectively complement each other. This further improves the effect of reducing uneven brightness in the virtual image 70.

The third embodiment rotates the wedge prism 351 at a rotation speed of 30 revolutions per second or more. The viewer cannot actually perceive the movement of bright portion BP. Therefore, it is possible to reliably provide the effect of moving uneven brightnesses resulting from interference of laser beams to more effectively complement each other. This can increase the certainty of providing the effect of reducing uneven brightness in the virtual image 70.

In the third embodiment, the laser scanner 310 can correspond to a laser irradiation portion (means). The screen 330 can correspond to a screen member. The micro lens 334 can correspond to an optical element. The convexly curved portion 332 can correspond to a curved surface portion. The wedge prism 351 can correspond to a deflection portion (means). The rotation mechanism 353 can correspond to a variation portion (means). The wedge prism 351 and the rotation mechanism 353 in cooperation can correspond to a first generation portion (means) and a second generation portion (means). The top surface 352a can correspond to a refracting surface.

Fourth Embodiment

Figure 15:
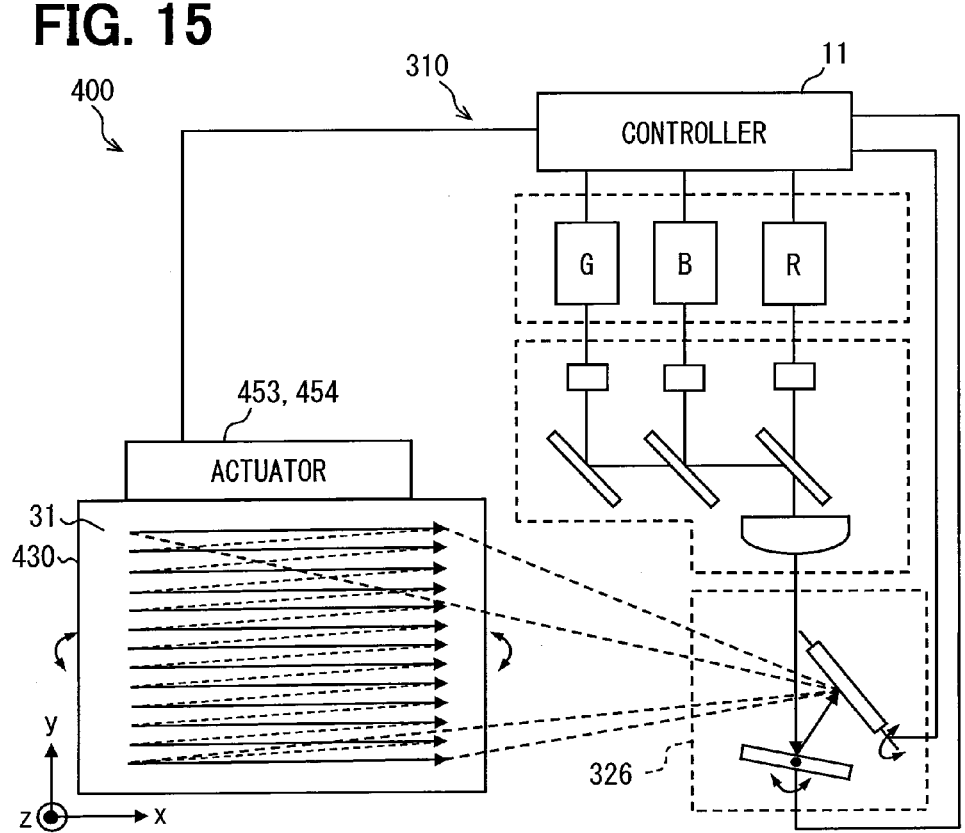
FIG. 15 is a diagram illustrating in detail the configuration of a rocking mechanism according to a fourth embodiment.
Figure 16:
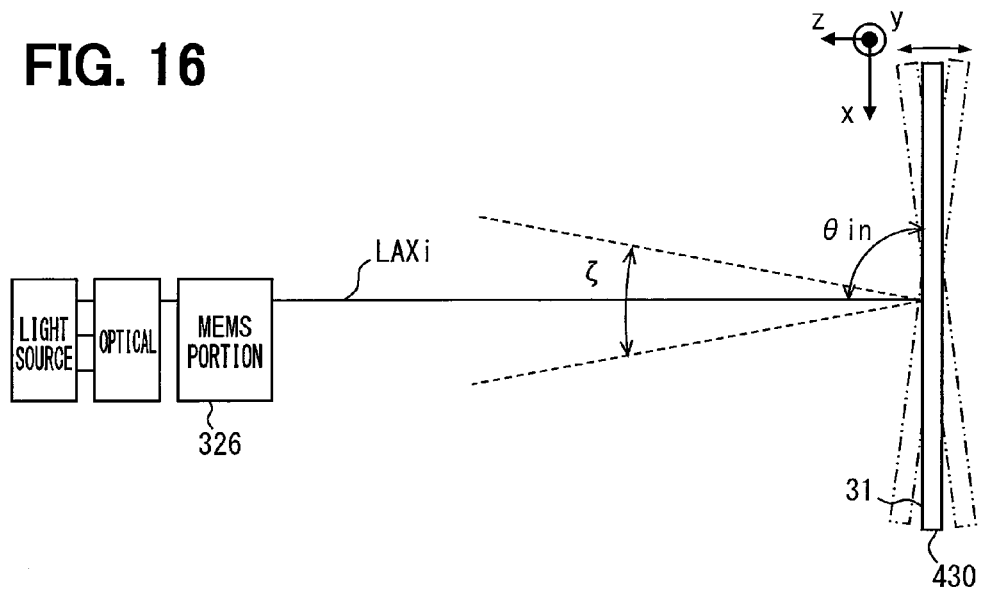
FIG. 16 is a diagram illustrating in detail the function of the rocking mechanism according to the fourth embodiment.
Figure 17:
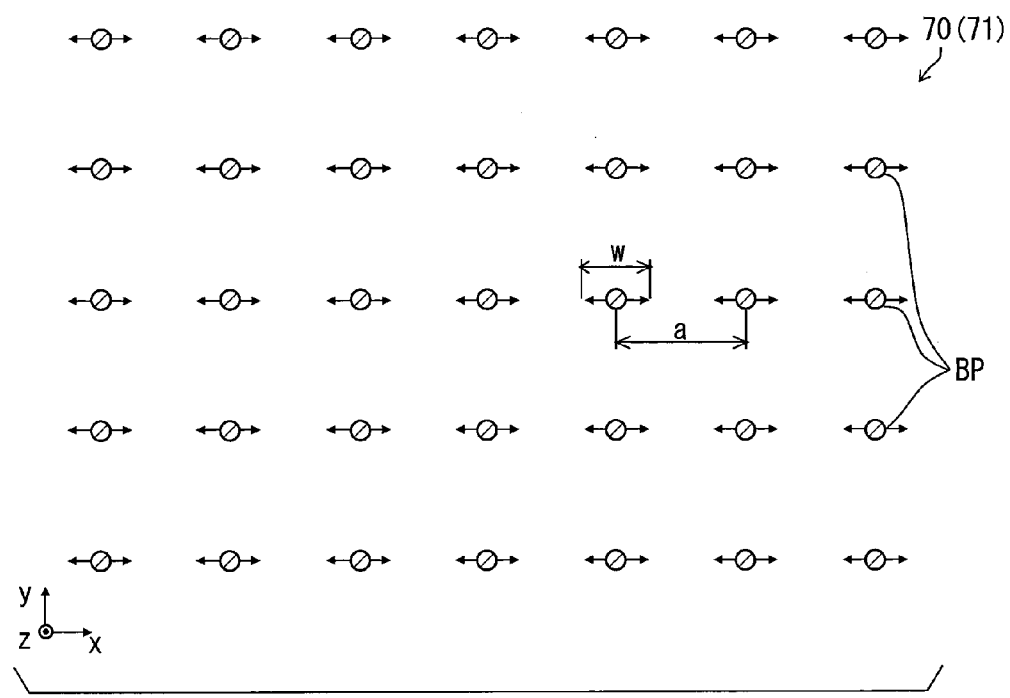
FIG. 17 is a diagram schematically illustrating the mechanism of linearly moving a bright portion caused by diffraction interference of a laser beam and thereby uniforming uneven brightness of a virtual image.

The fourth embodiment illustrated in FIGS. 15 through 17 is still another modification of the first embodiment. A head-up display device 400 illustrated in FIG. 15 includes the MEMS mirror portion 326 substantially equal to the third embodiment. The head-up display device 400 includes a rocking screen 430 and a rocking mechanism 453 to generate laser beams irradiated to the scan surface 331 from multiple directions like the first and second laser beams L1 and L2 (see FIG. 5) according to the first embodiment. The rocking screen 430 is a reflective screen similarly to the screen 30 according to the first embodiment (see FIG. 2). The chassis (not shown) supports the rocking screen 430 at its center in the x-axis direction so that both ends in the x-axis direction are capable of displacement in the z-axis direction.

The rocking mechanism 453 includes an actuator 454. The actuator 454 is connected to the controller 11 and vibrates the rocking screen 430 based on a drive signal from the controller 11. The rocking screen 430 thereby vibrates around the center in the x-axis direction, i.e., in the y-axis direction to rock the scan surface 31. The actuator 454 rocks the scan surface 31 at a rocking speed of 30 times per second or more.

As illustrated in FIG. 16, an incident angle $\theta$ in is formed between the scan surface 31 and the incident light axis line LAXi of a laser beam irradiated from the MEMS mirror portion 326. The incident angle $\theta$ in continuously varies with time. The laser scanner 310 and the rocking mechanism 453 illustrated in FIG. 15 in cooperation temporally vary directions of a laser beam irradiated to the scan surface 31.

As illustrated in FIG. 16, an amplitude angle $\zeta$ represents a deflection width in the normal direction occurring on the scan surface 31 of the tilted rocking screen 430. The amplitude angle $\zeta$ is twice the angle of vibration applied to the rocking screen 430 by the actuator 454 (see FIG. 15). In addition, the amplitude angle $\zeta$ differs from the interference angle $\alpha$ (see FIG. 5). Specifically, the amplitude angle $\zeta$ is favorably settled to be equal to the interference angle $\alpha$ multiplied by $(m+\Delta)$, where m is an integer and $\Delta$ is a value ranging from ⅓ to ⅔. The fourth embodiment settles the amplitude angle $\zeta$ to be equal to the interference angle $\alpha$ multiplied by $(m+½)$.

According to the above-mentioned configuration as illustrated in FIG. 17, interference of laser beams causes the spot-shaped bright portion BP on the virtual image 70. The bright portion BP repeats the movement at intervals of vibration width w along the x-axis direction. Vibration width w depends on the amplitude angle ζ. Vibration width w is approximately a half of interference interval "a" that depends on the interference angle α.

According to the fourth embodiment described so far, laser beams intensify each other due to interference at the bright portion BP that vibrates at 1/30 second along the x-axis direction. The bright portion BP is moved in too short a time to be perceived by the viewer. The viewer perceives the virtual image 70 of the display image 71 as if the virtual image 70 were made of overlapping laser beams irradiated from multiple directions. Uneven brightnesses resulting from interference of laser beams move to complement each other and thereby uniform intensity distributions of the laser beams reaching the eye box 60 (see part B of FIG. 1). Accordingly, the fourth embodiment can also reduce uneven brightness of the virtual image 70 resulting from interference of laser beams while maintaining the simple configuration of the rocking screen 430 on the scan surface 31.

The fourth embodiment settles the amplitude angle ζ to be equal to the interference angle α multiplied by (m+Δ). As a result, the trajectory of a moving bright portion BP does not overlap trajectories of the other adjacent bright portions BP. Uneven brightnesses resulting from interference of laser beams move to more effectively complement each other. This further improves the effect of reducing uneven brightness in the virtual image 70.

The fourth embodiment rocks the rocking screen 430 at a speed of 30 times per second or more. The viewer cannot actually perceive the movement of bright portion BP. Therefore, it is possible to reliably provide the effect of moving uneven brightnesses resulting from interference of laser beams to more effectively complement each other. This can increase the certainty of providing the effect of reducing uneven brightness in the virtual image 70.

In the fourth embodiment, the rocking screen 430 can correspond to a screen member. The rocking mechanism 453 can correspond to a variation portion (means). The laser scanner 310 and the rocking mechanism 453 in cooperation can correspond to a first generation portion (means) and a second generation portion (means).

Other Embodiments

While there have been described multiple embodiments, embodiments of the present disclosure are not limited to the above-mentioned embodiments but may include various embodiments and combinations.

According to the first and second embodiments, two or three laser beams are irradiated to the scan surface 31 from directions different from each other. There may be provided four or more laser beams to be irradiated to the scan surface. It is favorable to settle directions of irradiating four or more laser beams to the scan surface so that the same plane does not contain optical axis lines of any two or more laser beams. The first and second embodiments use the half mirror 29a to split a laser beam irradiated from the light source portion 13 and the optical portion 20 and thereby generate multiple laser beams. However, multiple light source portions and optical portions may be used to generate multiple laser beams.

The above-mentioned embodiments use the micro mirror array or the micro lens array as a screen member. The micro mirror array or the micro lens array provides an array of micro mirrors or micro lenses each of which forms a rectangular aperture corresponding to the convexly curved portion. The grid-like array may be replaced by a so-called hexagonal dense array i.e., an array of optical elements each of which forms a hexagonal aperture.

According to the third embodiment, the wedge prism 351 corresponds to a deflection portion (means). However, the wedge prism 351 may be replaced by a prism sheet, a diffraction grating, or a hologram grating as the deflection portion (means).

According to the fourth embodiment, the rocking screen 430 rocks at the center of the x-axis direction as a supporting point. However, the center for rocking may be changed as needed. For example, the rocking screen may be provided with a supporting point for rocking on the periphery of the x-axis direction. The fourth embodiment provides the rocking axis along the y-axis direction. Therefore, the rocking screen vibrates so that the bright portion BP reciprocates along the x-axis direction. It may be favorable to move the bright portion BP along the longer direction of the eye box 60. However, the rocking screen may be provided with the rocking axis along the x-axis direction so that the bright portion BP reciprocates along the y-axis direction. Further, the bright portion BP may reciprocate in a direction tilted against the x-axis and the y-axis.

According to the third embodiment, the wedge prism rotates at a rotation speed of 30 revolutions per second or more. According to the fourth embodiment, the rocking screen rocks at a rocking speed of 30 times per second or more. The rotation speed and the rocking speed may be favorably specified so as to exceed approximately half a frame rate (approximately 60 frames per second) for a display image drawn on the scan surface.

The above-mentioned embodiments describe examples of the head-up display device that is mounted on a vehicle and projects the display image 71 onto the windshield 90. The present disclosure may be applicable to various head-up display devices that are mounted on various transport devices and allow a viewer to view the virtual image 70 of the display image 71.

In the accompanying drawings, α denotes an interference angle. β, β1, β2, and β3 each denote an intersection angle. ε denotes a deflection angle. ζ denotes an amplitude angle. θ in denotes an incident angle. L1 denotes a first laser beam. L2 denotes a second laser beam. L3 denotes a third laser beam. LAX1 denotes a first optical axis line. LAX2 denotes a second optical axis line. LAX3 denotes a third optical axis line. LAXi denotes an incident light axis line. LAXo denotes an exit light axis line. 310 denotes a laser scanner (an example of a first generation portion (means), a second generation portion (means), or a laser beam irradiation portion (means)), 13 denotes a light source portion (an example of a laser beam irradiation portion (means)). 20 denotes an optical portion (an example of a laser beam irradiation portion (means)). 27 denotes a first scanner (an example of a first generation portion (means)). 28 denotes a second scanner (an example of a second generation portion (means)). 29a and 229a each denote a half mirror (an example of a split portion (means)). 29b denotes a mirror reflector (an example of a split portion (means)). 227 denotes a third scanner (an example of a third generation portion (means)). 30 and 330 each denote a screen (an example of a screen member). 430 denotes a rocking screen (an example of a screen member). 31 and 331 each denote a scan surface. 32 denotes a convexly curved portion (an example of a curved surface portion). 34 denotes a micro mirror (an example of an optical element). 334 denotes a micro lens (an example of an optical element). 351 denotes a wedge prism (an example of a first generation portion (means), a second generation portion (means), or a deflection portion (means)). 352a denotes a top surface (an example of a refracting surface). 353 denotes a rotation mechanism (an example of a first generation portion (means), a second generation portion (means), or a variation portion (means)). 453 denotes a rocking mechanism (an example of a first generation portion (means), a second generation portion (means), or a variation portion (means)). 60 denotes an eye box (an example of a visual region). 70 denotes a virtual image. 71 denotes a display image. 100, 300, and 400 each denote a head-up display device.

The embodiments, the configurations, and the modes of the present disclosure, as have been described, are not limited to the above-mentioned ones. For example, the scope of the embodiments, the configurations, and the modes of the disclosure also covers embodiments, configurations, and modes resulting from appropriately combining the disclosed technical aspects with different embodiments, configurations, and modes.

The invention claimed is:

1. A head-up display device that makes a virtual image of a display image visible from a predetermined visual region by projecting the display image, which is drawn on a scan surface by scanning a laser beam, the head-up display device comprising:
    a screen member provided with a plurality of optical elements each of which has a curved surface portion curved to spread the laser beam to the predetermined visual region, wherein the scan surface is defined by an array of the curved surface portions of the plurality of optical elements;
    a first generation portion that generates a first laser beam irradiated to the scan surface as the laser beam to draw the display image; and
    a second generation portion that generates a second laser beam irradiated to the scan surface from a direction different than the first laser beam as the laser beam to draw the display image; wherein
    an intersection angle between a first optical axis line of the first laser beam and a second optical axis line of the second laser beam is settled to be equal to $(m+\Delta)$ multiplied by an interference angle of the laser beams diffracted by the curved surface portions between orders of the laser beams, where m is an integer and $\Delta$ is a value ranging from $\frac{1}{3}$ to $\frac{2}{3}$.

2. The head-up display device according to claim 1, further comprising:
    a third generation portion that generates a third laser beam irradiated to the scan surface in an irradiation direction different than the first laser beam and the second laser beam as the laser beam to draw the display image, wherein the third laser beam is positioned to deviate from a plane containing the first optical axis line of the first laser beam and the second optical axis line of the second laser beam.

3. The head-up display device according to claim 1, further comprising:
    a laser beam irradiation portion that irradiates the laser beam; and
    a split portion that splits the laser beam irradiated from the laser beam irradiation portion to emit the split laser beams to the respective generation portions,
    wherein the laser beam irradiated from the split portion is reflected to the screen member by each generation portion.

4. A head-up display device that makes a virtual image of a display image visible from a predetermined visual region by projecting the display image, which is drawn on a scan surface by scanning a laser beam, the head-up display device comprising:
    a screen member provided with a plurality of optical elements each of which has a curved surface portion curved to spread the laser beam to the visual region, wherein the scan surface is defined by an array of the curved surface portions of the plurality of optical elements;
    a first generation portion that generates a first laser beam irradiated to the scan surface as the laser beam to draw the display image;
    a second generation portion that generates a second laser beam irradiated to the scan surface from a direction different than the first laser beam as the laser beam to draw the display image;
    a laser beam irradiation portion that irradiates the laser beam;
    a deflection portion that is positioned between the laser beam irradiation portion and the screen member and deflects the laser beam irradiated by the laser beam irradiation portion; and
    a variation portion that temporally varies a deflection angle direction of the laser beam that is incident on and exits from the deflection portion,
    wherein the deflection portion and the variation portion in cooperation are used as the first generation portion and the second generation portion.

5. The head-up display device according to claim 4,
    wherein a deflection angle between an incident light axis line of the laser beam incident on the deflection portion and an exit light axis line of the laser beam exiting from the deflection portion is settled to be equal to $\{(m+\Delta)/2\}$ multiplied by an interference angle of the laser beams diffracted by the curved surface portions between orders of the laser beams, where m is an integer and $\Delta$ is a value ranging from $\frac{1}{3}$ to $\frac{2}{3}$.

6. The head-up display device according to claim 4,
    wherein the deflection portion includes a refracting surface that tilts against an orthogonal plane orthogonal to a light axis line of the laser beam irradiated from the laser beam irradiation portion and that refracts the laser beam; and
    wherein the variation portion includes a rotation mechanism that rotates the deflection portion to vary an orientation of the refracting surface.

7. The head-up display device according to claim 6,
    wherein the rotation mechanism rotates the refracting surface at least at a rotation speed of 30 revolutions per second.

8. A head-up display device that makes a virtual image of a display image visible from a predetermined visual region by projecting the display image, which is drawn on a scan surface by scanning a laser beam, the head-up display device comprising:
    a screen member provided with a plurality of optical elements each of which has a curved surface portion curved to spread the laser beam to the visual region, wherein the scan surface is defined by an array of the curved surface portions of the plurality of optical elements;
    a first generation portion that generates a first laser beam irradiated to the scan surface as the laser beam to draw the display image;

a second generation portion that generates a second laser beam irradiated to the scan surface from a direction different than the first laser beam as the laser beam to draw the display image;

a laser beam irradiation portion that irradiates the laser beam to the scan surface; and a variation portion that temporally varies an incident angle between the scan surface and an incident light axis line of the laser beam irradiated from the laser beam irradiation portion, wherein the laser beam irradiation portion and the variation portion in cooperation are used as the first generation portion and the second generation portion.

9. The head-up display device according to claim 8, wherein an amplitude angle varied by the variation portion in accordance with the incident angle is settled to be equal to $(m+\Delta)$ multiplied by an interference angle of the laser beams diffracted by the curved surface portions between orders of the laser beams, where m is an integer and $\Delta$ is a value ranging from $\frac{1}{3}$ to $\frac{2}{3}$.

10. The head-up display device according to claim 8, wherein the variation portion includes a rocking mechanism that rocks the scan surface to vary the incident angle.

11. The head-up display device according to claim 10, wherein the rocking mechanism rocks the scan surface at least at a rocking speed of 30 times per second.

\* \* \* \* \*